R. H. McADAMS.
AUTOMATIC RESERVOIR FORMING PLOW.
APPLICATION FILED OCT. 14, 1913.
1,124,930.
Patented Jan. 12, 1915.
2 SHEETS—SHEET 1.
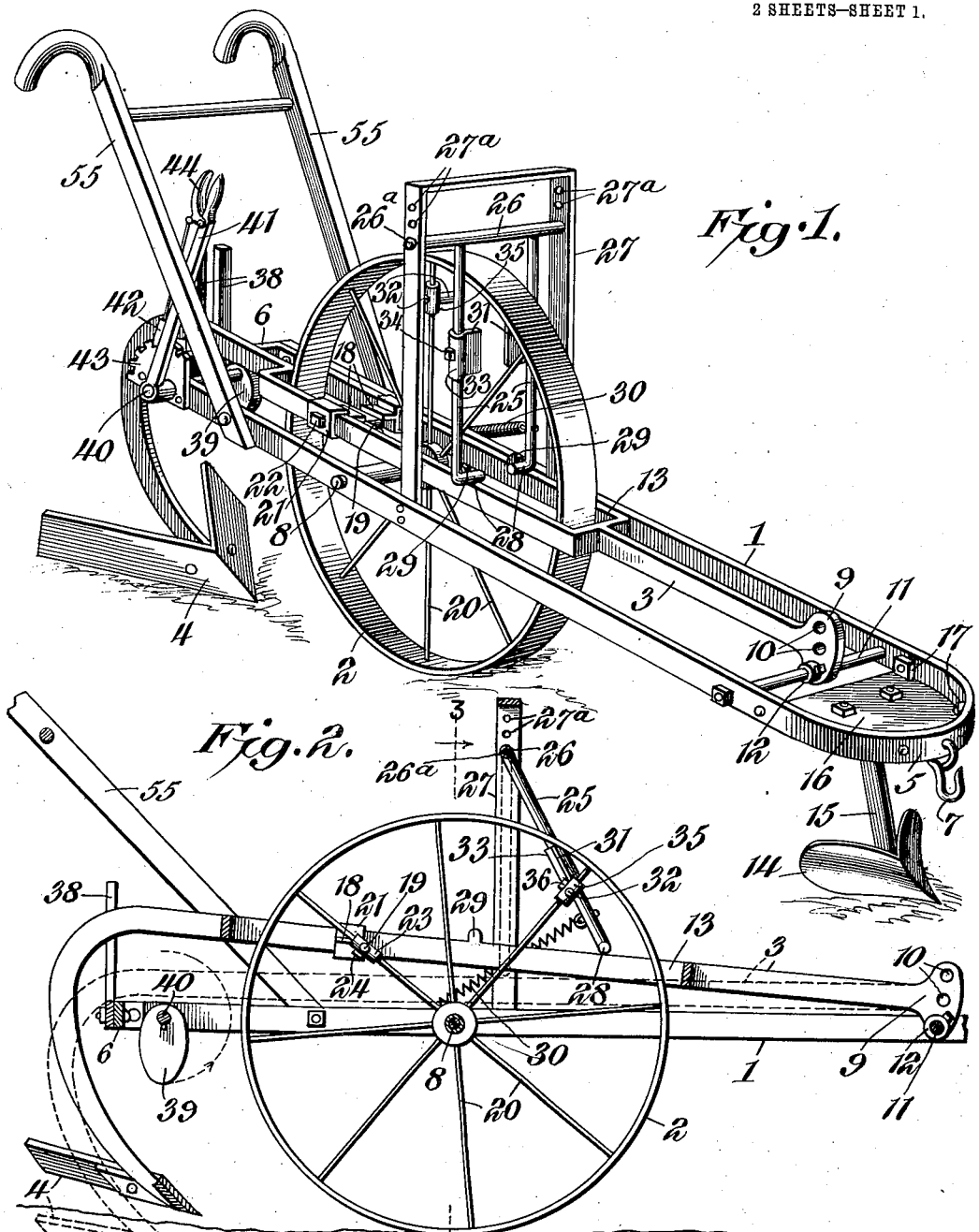
WITNESSES
Howard D. Orr
H. F. Riley
R. H. McAdams, INVENTOR,
BY E. G. Siggers
ATTORNEY

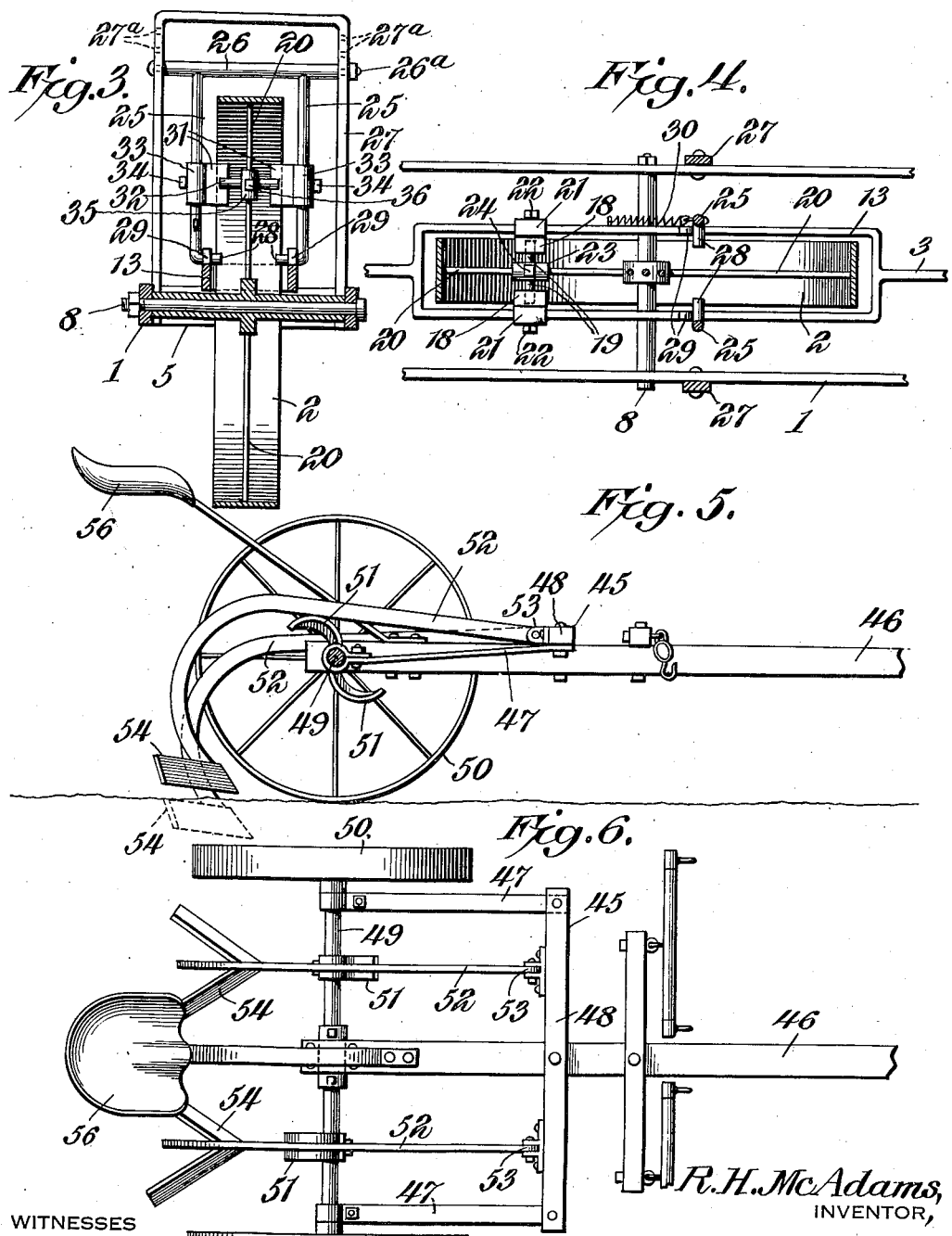

UNITED STATES PATENT OFFICE.

ROBERT H. McADAMS, OF DUE WEST, SOUTH CAROLINA.

AUTOMATIC RESERVOIR-FORMING PLOW.

1,124,930. Specification of Letters Patent. Patented Jan. 12, 1915.

Application filed October 14, 1913. Serial No. 795,126.

*To all whom it may concern:*

Be it known that I, ROBERT H. McADAMS, a citizen of the United States, residing at Due West, in the county of Abbeville and State of South Carolina, have invented a new and useful Automatic Reservoir-Forming Plow, of which the following is a specification.

The invention relates to an automatic reservoir forming plow.

The object of the present invention is to improve the construction of plows, and to provide a simple, efficient and comparatively inexpensive plow designed for the cultivation of cotton, corn and other plants, and equipped with means for automatically lifting a plow proper or furrow opening device to provide a series of reservoirs or furrow sections separated by intervening dams, and adapted to catch and hold the water, which might otherwise run off the ground.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a one horse automatic reservoir forming plow, constructed in accordance with this invention. Fig. 2 is a central longitudinal sectional view of the same. Fig. 3 is a transverse sectional view on the line 3—3 of Fig. 2. Fig. 4 is a horizontal sectional view of a portion of the plow. Fig. 5 is a longitudinal section view of a two horse automatic reservoir forming plow. Fig. 6 is a plan view of the same.

Like numerals of reference designate corresponding parts in all the figures of the drawings.

In Figs. 1 to 4 inclusive of the accompanying drawings, the invention is shown applied to a one horse plow comprising a substantially oblong main frame 1, a carrying wheel 2 and a pivotally mounted plow beam 3 adapted to be automatically lifted by the means hereinafter described to raise a furrow opening device 4 a sufficient distance above the bottom of the furrow to leave unplowed or dam portions and form a series of furrow sections or reservoirs separated by the said dam portions and adapted to catch and hold water. The main frame, which may be constructed of any suitable material, is composed of spaced sides and connecting front and rear portions 5 and 6, the front portion being preferably curved, as shown, and provided with a draft hook 7 or other suitable means for the attachment of a swingletree. The rear transverse connecting portion 6 is preferably straight and its terminals are suitably connected with the side bars of the frame. The carrying wheel 2, which is located in advance of the furrow opening device 4, is preferably provided with a broad rim or periphery, as shown, and it is mounted centrally on a shaft or axle 8, which is suitably secured at its terminals to the sides of the main frame 1.

The plow beam 3, which is preferably constructed of metal, is provided at the front end with a head or enlargement 9 having a plurality of perforations 10, arranged at intervals in substantially a vertical series and adapted to receive a transverse pivot rod 11, which is secured at its terminals to the sides of the frame near the front transverse connecting portion 5 thereof. The pivot 11, which is adapted to be arranged in any one of the perforations 10, is provided at opposite sides of the head 9 with set collars 12, adapted to retain the plow in a central position on the transverse rod 11. The pivot and the perforations permit an adjustment of the plow beam to secure a proper set of the same. The plow beam is provided at a point intermediate of its ends with an oblong opening 13, receiving the wheel 2 and composed of spaced sides and front and rear connecting portions formed integral with the sides and with the front and rear portions of the plow beam. The rear portion of the plow beam extends beyond the rear end of the main frame 1 and curves downwardly and forwardly, and the furrow opening device 4 is suitably secured to the said rear portion of the beam 3.

In the accompanying drawings, the furrow opening device is shown in the form of a double moldboard share consisting of two straight angularly disposed blades, but any other form of furrow opening share or device may be employed, and the plow may be equipped at the front with a suitable colter 14, secured to the lower end of a front standard 15, which is attached at its upper terminal to a substantially horizontal plate 16. The horizontal plate, which is approximately segmental to conform to the configuration of the front portion of the main frame 1, is provided at opposite sides with spaced lugs 17, which are riveted or otherwise secured to the inner faces of the sides and front portion of the main frame.

The plow beam is provided at opposite sides of the central oblong wheel receiving portion with inwardly extending projections or flanges 18 arranged in the path of a pair of laterally projecting lifting tappets 19, mounted on one of the spokes 20 of the wheel 2 and adapted at each revolution thereof to engage beneath the projections or flanges 18 of the plow beam and lift the latter from the furrow. The lifting tappets in the forward rotation of the wheel are carried from beneath the flanges or projections 18 and the plow beam is permitted to drop and reëngage the furrow forming device with the soil. The projections or flanges 18 are carried by rectangular sleeves 21, arranged on the spaced side portions of the plow beam and adjustably secured to the same by set screws 22, piercing the outer walls of the sleeves and frictionally engaging the beam. The laterally projecting lifting tappets 19 are carried by a cylindrical sleeve 23, which is secured at the desired adjustment on the spoke of the wheel by a set screw 24. The flanges or projections of the beam and the lifting tappets of the wheel are adapted to be adjusted to secure the desired lifting action and to vary the height to which the beam is elevated in the operation of the plow. The lifting tappets may be mounted on one or more of the spokes of the wheel to vary the interval between the lifting operations of the plow beam and the consequent length of the furrow sections or reservoirs, and various equivalent means may be employed for lifting the plow beam and timing such operations thereof.

The plow beam is equipped with an oscillatory locking device adapted to hold the plow beam rigidly against upward movement while the furrow opening device is in engagement with the soil, and it is composed of spaced side rods 25 and a connecting top portion 26, which is pivotally mounted in an approximately inverted U-shaped support 27. The side rods 25, which are arranged between the sides of the support 27 in spaced relation with the same, are provided at their lower terminals with approximately horizontal arms 28, which extend across the upper edges of the sides of the oblong portion of the plow beam when the oscillatory locking device is in a vertical position and in engagement with the said beam, as illustrated in Figs. 1 to 3 of the drawings. The oscillatory locking device may be pivotally mounted in the support 27 in any preferred manner. In the accompanying drawings the top connecting portion 26 of the locking device is tubular and a rod 26$^a$ extends through the tubular portion 26 and is adapted to be arranged in any pair of a plurality of perforations 27$^a$ in the upper portions of the sides of the support 27. The rod 26$^a$ is provided at the end with a head and is threaded at the other end for the reception of a nut, and the perforations 27$^a$ permit a vertical adjustment of the oscillatory locking device to adapt the same to be arranged in operative position to engage with the plow beam when the latter is adjusted or limited in its downward movement to vary the depth of the furrow, as hereinafter fully explained. The sides of the support 27 are suitably secured at their lower ends to the side bars of the main frame, and the plow beam is provided at opposite sides of its oblong portion with projecting lugs 29, located in rear of the arms 28, which extend inwardly at the lower terminals of the side rods 25. The locking device is maintained in contact with the upstanding stop lugs 29 by a coiled spring 30, secured at its front end to one of the side rods 25 and connected at its rear end to the main frame in rear of the support 27. The locking device, which straddles the wheel, is equipped at opposite sides with adjustable projections or flanges 31, arranged in the path of a pair of laterally projecting beam releasing tappets 32, mounted on one of the spokes of the wheel and arranged to engage the projections or flanges 31 just prior to the time when the lifting tappets engage with the projections or flanges 18 of the plow beam, so that the plow beam will be unlocked and free to be raised by the lifting tappets 19. The projections or flanges 31, which extend inwardly from the side rods of the locking device, are carried by sleeves 33, adjustable upwardly and downwardly on the said side rods and secured to the same by set screws 34. The beam releasing tappets are also carried by a cylindrical sleeve 35, which is adjustably secured to one of the spokes of the wheel 20 by a set screw 36. The number of beam releasing tappets will in practice correspond with the number of lifting tappets and will be arranged to release the beam prior to the lifting thereof.

The plow beam is guided in its vertical movement by a pair of vertical bars 38, secured at their lower ends to the rear transverse bar 6 of the main frame and spaced apart to receive the rear portion of the plow beam and adapted to prevent the same from moving laterally out of a true central position. The plow is equipped at the rear portion of the main frame with a cam 39, located beneath and adapted to lift the plow beam and mounted on a transverse shaft 40 journaled in suitable bearings of the sides of the main frame and having an operating arm or lever 41 at one end for rotating the shaft to swing the cam upwardly and downwardly. The cam is adapted to maintain the plow beam in an elevated position out of contact with the ground, and it is also adapted to serve as an adjustable stop for limiting the downward movement of the plow beam to vary the depth of the furrow sections or reservoirs. It is locked in its adjustment by means of a dog or detent 42, mounted on the operating arm or lever 41 and arranged to engage a toothed plate 43 and connected with a latch lever 44, arranged adjacent to an upper handle portion of the operating arm or lever 41. The toothed plate 43 is fixed to the frame 1 at one side thereof. The oscillatory locking device is adjusted upwardly when the cam is adjusted to limit the penetration of the furrow opening device, and the adjustment of the oscillatory locking device enables the sides thereof to engage properly with the lugs 29 of the side portions of the beam in the various adjustments of the cam 39.

In Figs. 5 and 6 of the drawings is illustrated a two horse plow comprising a frame 45 having a draft beam or tongue 46 and composed of spaced sides 47 and a transverse connecting portion 48. The sides are provided at their rear ends with suitable bearings for the reception of a rotary shaft or axle 49 of a pair of carrying wheels 50. The tongue or pole 46 preferably extends rearwardly to the shaft or axle 49 and is supported by the same, and the said shaft or axle is provided at opposite sides with curved lifting arms 51, arranged to engage and automatically lift plow beams 52 pivoted at their front ends 53 to the transverse connecting bar or beam of the frame 45 and equipped with suitable furrow opening shares or blades 54 and adapted to be alternately lifted by the arms 51. The plow may be equipped with any number of pivoted beams and lifting arms, and the latter will be arranged to alternately lift the plow beams so that the furrow sections or reservoirs of the adjacent rows will be staggered to effect a more uniform distribution of any water contained within them.

The one horse plow illustrated in Figs. 1 to 4 inclusive of the drawings is provided with suitable handles 55, secured to the sides of the main frame and extending upwardly and rearwardly therefrom. In the form of invention shown in Figs. 5 and 6 of the drawings, the riding plow is provided with a suitable seat 56 having a standard secured to the tongue or pole and extending upwardly and rearwardly therefrom, the seat being located in rear of the shaft or axle 49.

What is claimed is:—

1. A plow of the class described including a pivotally mounted plow beam provided with a furrow opening device, means for automatically lifting the plow beam at intervals to form a series of furrow sections or reservoirs and intervening unplowed portions or dams, which separate the furrow sections or reservoirs, and automatically operated means engaging the plow beam at intervals for holding the same against upward movement.

2. A plow of the class described, including a pivotally mounted plow beam provided with a furrow opening device, a movable locking device for holding the plow beam against upward movement, and means operating at intervals for releasing the plow beam and for lifting the same to form a series of furrow sections or reservoirs and intervening unplowed portions or dams.

3. A plow of the class described including a frame, a plow beam pivotally mounted in the frame and provided with a furrow opening device, a movable locking device for holding the plow beam against upward movement, and a rotary element having a beam releasing tappet arranged to engage the locking device, said rotary element being also provided with a lifting tappet arranged to elevate the plow beam after the same has been released from the locking device.

4. A plow of the class described including a frame, a pivotally mounted plow beam having a furrow opening device, a wheel located in advance of the furrow opening device, a locking device carried by the frame and arranged to hold the beam against upward movement, and tappets carried by the wheel and arranged to engage the locking device and the beam to automatically release the latter and elevate the beam after the same has been released from the locking device.

5. A plow of the class described including a frame, a carrying wheel supporting the frame, a pivotally mounted plow beam having an opening located at a point intermediate of the ends of the plow beam and receiving the wheel, said plow beam being provided in rear of the wheel with a furrow opening device, a lifting tappet mounted on the said wheel, and means carried by the plow beam at the said opening and arranged in the path of the tappet, whereby the plow beam is automatically elevated at intervals.

6. A plow of the class described including a frame, a wheel supporting the frame, a pivotally mounted plow beam arranged to swing upwardly and downwardly, a pivoted locking device located above the plow beam and arranged to engage the same to hold the plow beam against upward movement, and beam releasing and lifting tappets carried by the said wheel and arranged to swing the locking device out of engagement with the beam and to lift the latter when the said beam is released by the locking device.

7. A plow of the class described including a frame, a carrying wheel supporting the frame, a pivotally mounted plow beam having an opening receiving the wheel, a furrow opening device carried by the plow beam and located in rear of the wheel, a pivoted locking device having spaced sides straddling the wheel and arranged to engage the plow beam at opposite sides of the opening thereof, and beam releasing and lifting tappets carried by the wheel and arranged to swing the locking device out of engagement with the plow beam and lift the latter.

8. A plow of the class described including a frame, a pivoted beam arranged to swing upwardly and downwardly and provided with a projecting stop, a pivoted locking device located above the beam and arranged to engage the same to hold the beam against upward movement, a spring connected with the locking device and arranged to hold the same normally in engagement with the beam and against the said stop, and a rotary element provided with beam releasing and lifting tappets arranged to swing the locking device out of engagement with the beam and to lift the latter when the same has been released by the locking device.

9. A plow of the class described including a frame, a pivoted beam provided intermediate of its ends with a longitudinal opening and having a furrow opening device, sleeves adjustably mounted on the plow beam at opposite sides of the opening and having inwardly projecting portions, a wheel supporting the frame and arranged in the opening of the beam and having spokes, and a sleeve mounted on a spoke of the wheel and provided with laterally projecting lifting tappets arranged to engage the projections of the sleeves of the beam, whereby the latter is automatically raised at intervals.

10. A plow of the class described including a frame provided at the front with a transverse pivot, a plow beam provided at the front with a plurality of perforations adapted to receive the pivot for changing the set of the plow, adjustable means arranged at the rear of the frame and forming a stop for supporting the beam, and a rotary element provided with a tappet arranged to lift the beam automatically at intervals.

11. A plow of the class described including a frame, a plow beam pivotally mounted in the frame at its front portion, and means located at the rear portion of the frame for adjustably supporting the plow beam, said means including a rotary cam arranged beneath the beam.

12. A plow of the class described, including a frame, a carrying wheel supporting the frame, a plow beam provided at a point intermediate of its ends with an opening receiving the carrying wheel, means located in advance of the opening for adjustably pivoting the front end of the plow beam, means mounted on the frame and located in rear of the said opening for adjustably supporting the plow beam, and a tappet mounted on the carrying wheel and arranged to engage the plow beam for lifting the same automatically at intervals.

13. A plow of the class described including a frame, a plow beam pivotally mounted at its front portion in the frame and having a furrow opening device, means operating at intervals for automatically lifting the plow beam at intervals, and means located at the rear portion of the frame in rear of the said lifting means for guiding the plow beam in its upward and downward movements.

14. A plow of the class described including a frame, a plow beam pivotally mounted in the frame, means for automatically raising the plow beam at intervals, and a guide located at the rear portion of the frame and composed of spaced side portions receiving the plow beam between them.

15. A plow of the class described including a frame composed of sides spaced apart to permit a plow beam to be mounted between them and a front portion connecting the sides, and a plate fitted within and completely filling the front end portion of the frame and having its side and front edges fitting against the same, said plate constituting means for the attachment of a colter and provided with projecting lugs secured to the said frame.

16. A plow of the class described including a frame, a plow beam pivotally mounted in the frame, means for automatically lifting the plow beam at intervals to form a series of furrow sections or reservoirs and intervening unplowed portions, an adjustable device arranged in the path of the plow beam for limiting the downward movement thereof for varying the depth of the furrows or reservoirs, and a vertically adjustable locking device located above the beam and arranged to engage the same to hold the beam against upward movement while in engagement with the soil.

In testimony, that I claim the foregoing as my own, I have hereto affixed my signature in the presence of two witnesses.

ROBERT H. McADAMS.

Witnesses:
S. C. JOHNSTON,
JOHN L. PRESSLY.